United States Patent
Lin et al.

(10) Patent No.: US 9,490,856 B2
(45) Date of Patent: *Nov. 8, 2016

(54) METHOD FOR SUPPRESSING TRANSMISSION NOISE COMPRISED IN RECEIVED DOWNLINK SIGNAL AND COMMUNICATIONS APPARATUS UTILIZING THE SAME

(71) Applicant: MediaTek Inc., Hsin-Chu (TW)

(72) Inventors: Chih-Yuan Lin, Wujie Township, Yilan County (TW); Qiang Zhou, San Jose, CA (US); Charles Chien, Newbury Park, CA (US); Paul Cheng Po Liang, Zhubei (TW); Wen-Wei Yang, Jhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/847,205

(22) Filed: Sep. 8, 2015

(65) Prior Publication Data
US 2015/0381223 A1    Dec. 31, 2015

Related U.S. Application Data

(63) Continuation of application No. 13/777,286, filed on Feb. 26, 2013, now Pat. No. 9,160,462.

(60) Provisional application No. 61/607,113, filed on Mar. 6, 2012.

(51) Int. Cl.
*H04B 1/44* (2006.01)
*H04B 1/10* (2006.01)
(Continued)

(52) U.S. Cl.
CPC .......... *H04B 1/1036* (2013.01); *H04B 1/0475* (2013.01); *H04B 1/1081* (2013.01); *H04B 1/40* (2013.01); *H04B 1/525* (2013.01); *H04B 15/00* (2013.01); *H04B 1/0067* (2013.01)

(58) Field of Classification Search
CPC .............. H04B 1/0475; H04B 1/0067; H04B 7/15585; H04B 5/1461
USPC ........ 455/78, 501, 550.1, 552.1, 553.1, 445, 455/67.11, 63.1, 503, 73, 422.1, 403, 426.1, 455/426.2, 423–425; 370/310, 328, 329, 370/343
See application file for complete search history.

(56) References Cited

U.S. PATENT DOCUMENTS 7,860,529 B2    12/2010  Sathath
8,134,992 B1     3/2012  Nam et al.
(Continued)

FOREIGN PATENT DOCUMENTS

CN          102111168       6/2011
WO       WO 2007/108629    9/2007
(Continued)

OTHER PUBLICATIONS

"3GPP TR 36.816, Studying on Signaling and Procedure for Interference Avoidance for In-Device Coexistence;" 2011; pp. 1-44.
(Continued)

*Primary Examiner* — Keith Ferguson
(74) *Attorney, Agent, or Firm* — McClure, Qualey & Rodak, LLP

(57) ABSTRACT

A method suppresses transmission noise comprised in a plurality of downlink signals received by one of a first radio module or a second radio module comprised in a communications apparatus. The method receives a plurality of first signals and a plurality of second signals, wherein the first signals and the second signals are the downlink signals respectively received via different antennas of the one of the first radio module or the second radio module, or the first signals are the downlink signals received by the one of the first radio module or the second radio module and the second signals are a portion of the uplink signals provided by the other one of the first radio module and the second radio module, and processes the plurality of first signals and the plurality of second signals to cancel transmission noise comprised in the plurality of downlink signals.

11 Claims, 15 Drawing Sheets

(51) Int. Cl.
  *H04B 15/00*  (2006.01)
  *H04B 1/04*  (2006.01)
  *H04B 1/525*  (2015.01)
  *H04B 1/40*  (2015.01)
  *H04B 1/00*  (2006.01)

(56) References Cited

U.S. PATENT DOCUMENTS

| | | |
|---|---|---|
| 8,254,343 B2 | 8/2012 | Liu et al. |
| 2003/0109276 A1* | 6/2003 | Wilson .................. H04B 1/0057 455/552.1 |
| 2006/0111042 A1 | 5/2006 | Pitchers |
| 2006/0281488 A1* | 12/2006 | Chang .................. H04B 1/0082 455/553.1 |
| 2009/0040937 A1 | 2/2009 | Xhafa et al. |
| 2009/0081962 A1 | 3/2009 | Sohrabi |
| 2010/0227570 A1 | 9/2010 | Hendin |
| 2010/0304737 A1 | 12/2010 | Jain et al. |
| 2010/0304770 A1 | 12/2010 | Wietfeldt et al. |
| 2011/0149920 A1 | 6/2011 | Liu et al. |
| 2012/0040676 A1 | 2/2012 | Jang et al. |
| 2012/0082070 A1 | 4/2012 | Hart et al. |
| 2012/0082140 A1 | 4/2012 | Lin et al. |

FOREIGN PATENT DOCUMENTS

| | | |
|---|---|---|
| WO | WO 2010/089281 | 8/2010 |
| WO | WO 2011/148341 | 12/2011 |

OTHER PUBLICATIONS

Omer, M., et al; "A PA-Noise Cancellation Technique for Next Generation Highly Integrated RF Front-Ends;" IEEE Radio Frequency Integrated Circuits Symposium; 2012; pp. 471-474.

\* cited by examiner

METHOD FOR SUPPRESSING TRANSMISSION NOISE COMPRISED IN RECEIVED DOWNLINK SIGNAL AND COMMUNICATIONS APPARATUS UTILIZING THE SAME

CROSS REFERENCE TO RELATED APPLICATIONS

This application is a continuation of U.S. patent application Ser. No. 13/777,286, filed on Feb. 26, 2013, now U.S. Patent No. 9,160,462, which claims the benefit of U.S. Provisional Application No. 61/607,113 filed 2012/03/06 and entitled "ADAPTIVE TRANSMITTER SKIRT SUPPRESSION FOR IN DEVICE CO-EXISTENCE PROBLEM". The entire contents of which are hereby incorporated by reference.

BACKGROUND OF THE INVENTION

Field of the Invention

The invention relates to a communications apparatus, and more particularly to a communications apparatus capable of simultaneously providing more than one radio access technology (RAT) communications standard with transmission noise suppression.

Description of the Related Art

With advancements in communications techniques, mobile stations (MS, which may be interchangeably referred to as user equipment (UE)) are now capable of handling multiple radio access technologies (RAT), such as at least two of GSM/GPRS/EDGE (Global System for Mobile Communications/General Packet Radio Service/Enhanced Data rates for Global Evolution), W-CDMA (Wideband Code Division Multiple Access) RAT, WiFi (Wireless Fidelity), LTE (Long Term Evolution), or the like via one communications apparatus.

Generally, different RATs operate in different frequency bands. However, some of them may still operate in a frequency band that is close to or even overlaps with the operating band of one or more RATs. For example, the LTE band 40 (2300 MHz~2400 MHz) is very close to the ISM (Institute for Supply Management) band (2400 MHz~2483.5 MHz), and there is nearly no guard band between the LTE band 40 and the ISM band.

When considering the non-linearity of radio-frequency (RF) devices utilized in a radio module, high-order intermodulation (IM) terms may be generated and occupy a wide range of frequency bands. For example, a power amplifier may generally generate the high-order IM terms and wideband noise. Therefore, when two radio modules having operating bands that are close to or overlap each other are integrated into one communications apparatus, mutual interference may occur when one is transmitting uplink signals and the other one is receiving downlink signals, since the transmitted uplink signals may leak to (that is, be captured by) the antenna of the receiving radio module. Those IM terms and wideband transmitter noise are together called TX skirts.

FIG. 1 shows a frequency spectrum of the WiFi transmitting signal and LTE receiving signal. As shown in FIG. 1, the TX skirts (TX_Skirt) of the WiFi transmitting signal (WiFi_TX_Signal) leaks to LTE operating bands and becomes noise that interferes with the LTE receiving signal (LTE_RX_Signal). This is even worse when the transmission noise is so strong because the two radio modules are usually disposed very close to each other when integrated into one communications apparatus.

Therefore, a communications apparatus capable of simultaneously providing more than one radio access technology (RAT) communications standard with transmission noise suppression is required.

BRIEF SUMMARY OF THE INVENTION

Communications apparatuses and methods for suppressing transmission noise comprised in a plurality of downlink signals received by one of a first radio module or a second radio module comprised in a communications apparatus are provided. An exemplary embodiment of a communications apparatus comprises a first radio module, a second radio module and a transmission noise suppression device. The first radio module provides a first wireless communications service and communicates with a first communications device in compliance with a first protocol. The second radio module provides a second wireless communications service and communicates with a second communications device in compliance with a second protocol. The transmission noise suppression device is coupled to at least one of the first radio module and the second radio module and operative to process a plurality of downlink signals received by the first radio module to cancel transmission noise comprised in the plurality of downlink signals received by the first radio module, wherein the transmission noise is generated when the second radio module is processing a plurality of uplink signals to be transmitted.

An exemplary embodiment of a method for suppressing transmission noise comprised in a plurality of downlink signals received by one of a first radio module and a second radio module comprised in a communications apparatus, where the transmission noise is generated when another one of the first radio module and the second radio module is processing a plurality of uplink signals to be transmitted. The method comprises: receiving a plurality of first signals and a plurality of second signals; calculating a plurality of filter parameters for a filter according to the first signals and the second signals; filtering the first signals via the filter to obtain a plurality of filtered signals; subtracting the second signals from the filtered signals to obtain a plurality of processed signals. The first signals and the second signals are the downlink signals respectively received via different antennas of the one of the first radio module or the second radio module, or the first signals are the downlink signals received by the one of the first radio module or the second radio module and the second signals are a portion of the uplink signals provided by the other one of the first radio module or the second radio module. The transmission noise does not manifest in the processed signals.

Another exemplary embodiment of a communications apparatus comprises a first radio module and a second radio module. The first radio module provides a first wireless communications service and communicates with a first communications device in compliance with a first protocol. The second radio module provides a second wireless communications service and communicates with a second communications device in compliance with a second protocol. The second protocol is different from the first protocol. A transmitting signal of the first radio module is drawn, by a coupling path, to a down-conversion circuit to be down-converted to a frequency band utilized by the second radio module.

Another exemplary embodiment of a method applied in a communications apparatus comprising a first radio module or a second radio module for suppressing transmission noise comprised in a plurality of downlink signals received by the second radio module, wherein the transmission noise is generated when the first radio module is processing a plurality of uplink signals to be transmitted, comprises: coupling a transmitting path of the first radio module to a down-conversion circuit; down-converting a transmitting signal of the first radio module to a frequency band utilized by the second radio module to generate a down-converted signal; and processing the down-converted signal and a plurality of downlink signals received by the second radio module to cancel transmission noise comprised in the plurality of downlink signals.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
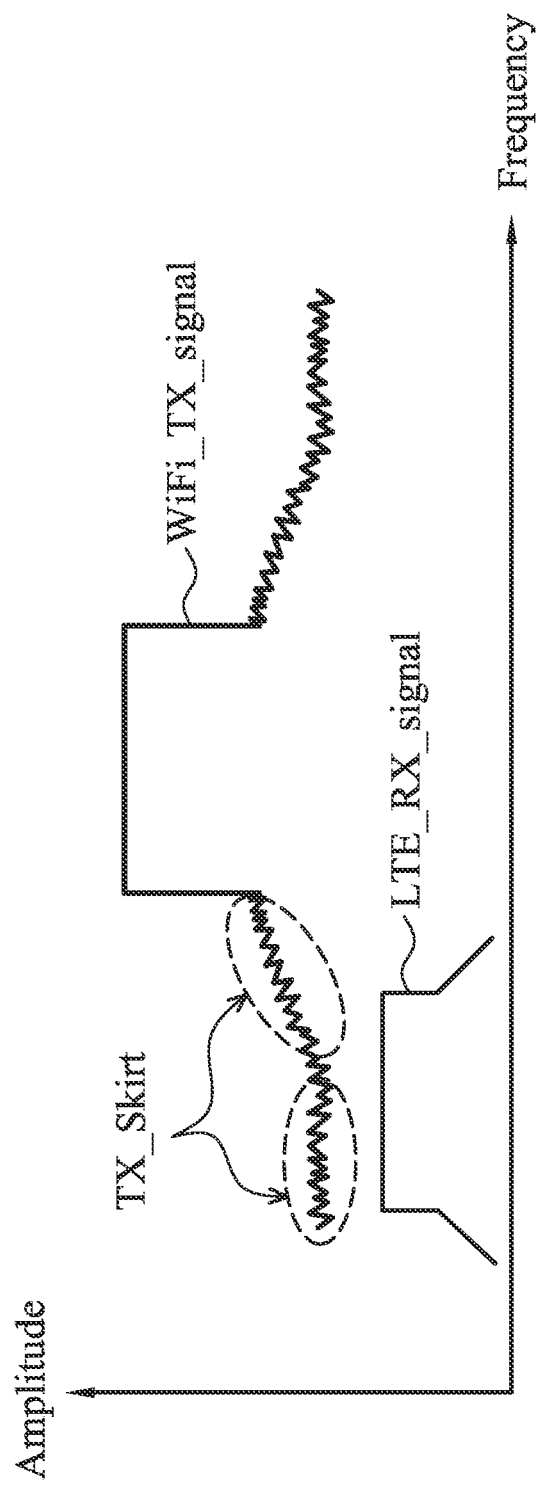
FIG. 1 shows a frequency spectrum with the TX skirts of a WiFi transmitting signal leaking to the LTE operating bands to interfere with the LTE receiving signal.
Figure 2:
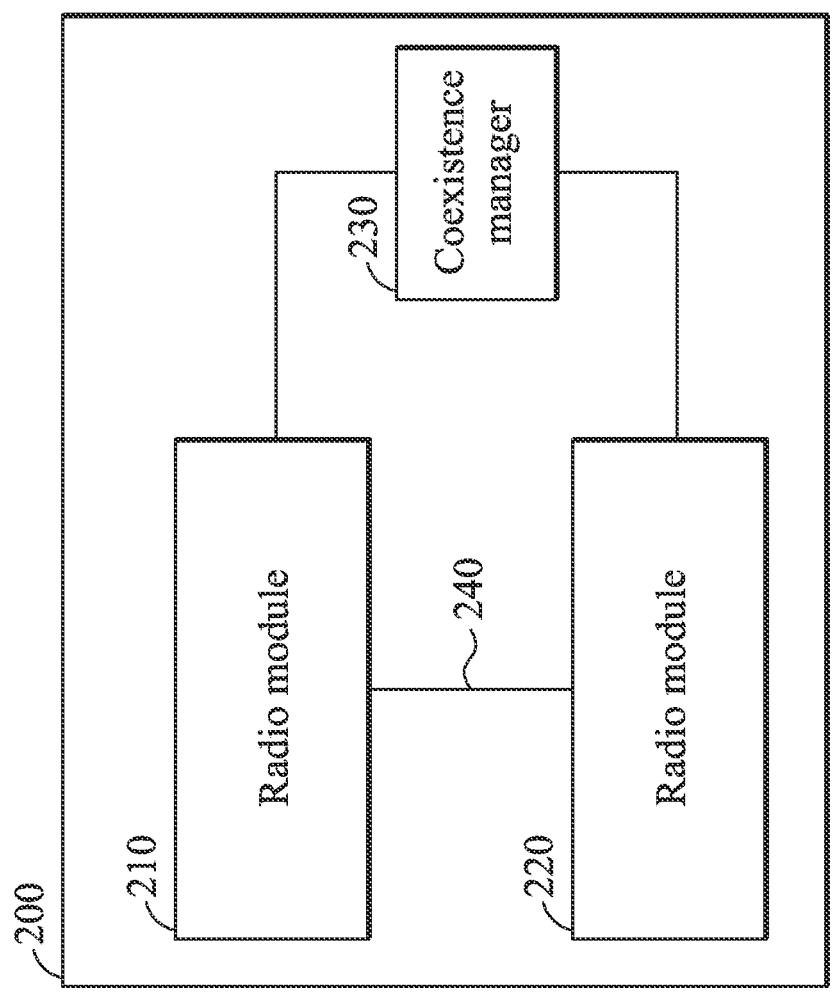
FIG. 2 shows a block diagram of a communications apparatus according to an embodiment of the invention.

FIG. 2 shows a block diagram of a communications apparatus according to an embodiment of the invention wherein the communications apparatus 200 may comprise at least two radio modules 210 and 220 and a coexistence manager 230. The radio module 210 is arranged to provide a first wireless communications service and may communicate with a first peer communications device (for example, a base station, an access point, or the like) in compliance with a first protocol. The radio module 220 is arranged to provide a second wireless communications service and may communicate with a second peer communications device (for example, a base station, an access point, or the like) in compliance with a second protocol. The coexistence manager 230 is coupled to the radio modules 210 and 220 and is arranged to manage coordination between the transceiving operations of the radio modules 210 and 220.

Note that in some embodiments of the invention, the communications apparatus 200 may also comprise more than two radio modules. In yet other embodiments of the invention, the coexistence manager 230 may be integrated in either of the radio modules 210 or 220. Therefore, the architecture as shown in FIG. 2 is merely an example to give clear illustrations of the concept of the invention, and the invention should not be limited thereto. Note further that, in the embodiments of the invention, the radio modules 210 and 220 may be implemented in different chips, or may be integrated into one chip, such as an SoC (system on chip), and connect to each other by internal wires. Therefore, the invention should not be limited to any specific implementation method.

In the embodiments of the invention, the communications apparatus 200 may be a notebook computer, a cellular phone, a portable gaming device, a portable multimedia player, a tablet computer, a Global Positioning System (GPS) receiver, a Personal Digital Assistant (PDA), or others. In addition, in the embodiments of the invention, the radio modules co-located in the communications apparatus may include a WiMAX module, a WiFi module, a Bluetooth module, a 2G/3G/4G or LTE module, a GSP module, or others, for providing the corresponding communications services in compliance with the corresponding protocols.

Figure 3:
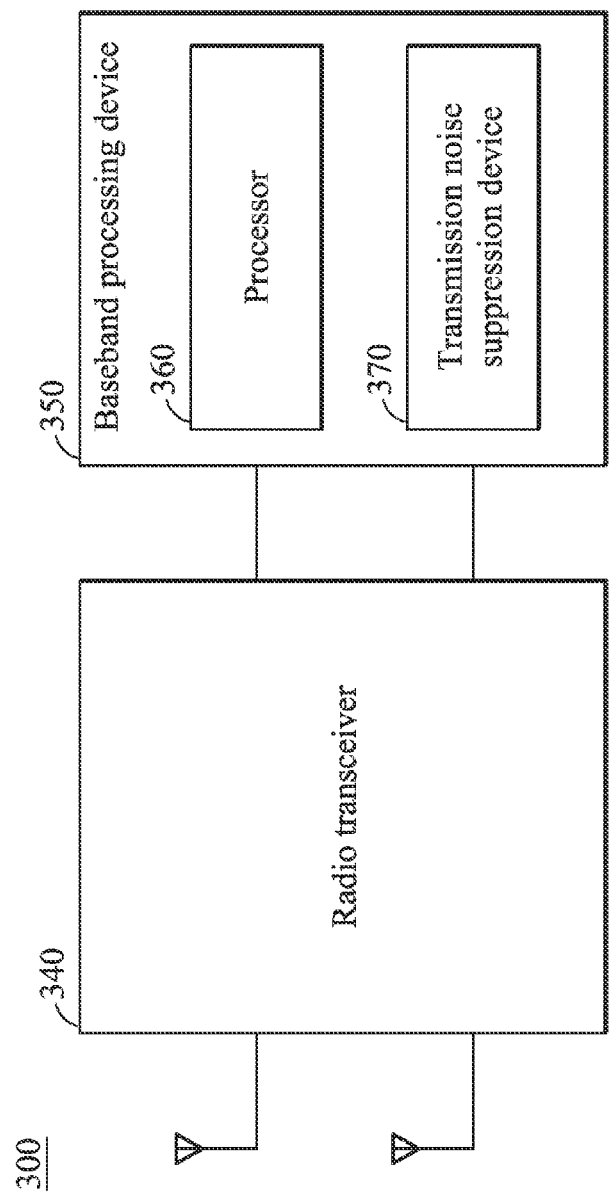
FIG. 3 shows a block diagram of a radio module according to an embodiment of the invention.

FIG. 3 shows a block diagram of a radio module according to an embodiment of the invention. The radio module 300 may at least comprise one or more antennas, a radio transceiver 340 and a baseband processing device 350. The radio module 300 may be one or both of the radio modules 210 and 220 as shown in FIG. 2. Note that although there are two antennas shown in FIG. 3, it should be understood that the radio module 300 may also comprise only one, or more than two, antennas. Therefore, the invention should not be limited thereto.

The radio transceiver 340 may receive wireless radio frequency signals via one or more of the antennas, convert the received signals to baseband signals to be processed by the baseband processing device 350, or receive baseband signals from the baseband processing device 350 and convert the received signals to wireless radio frequency signals to be transmitted to a peer communications device. The radio transceiver 340 may comprise a plurality of hardware devices to perform radio frequency conversion. For example, the radio transceiver 340 may comprise a mixer to multiply the baseband signals with a carrier oscillated in the radio frequency of the corresponding wireless communications system.

The baseband processing device 350 may further convert the baseband signals to a plurality of digital signals, and process the digital signals, and vice versa. The baseband processing device 350 may also comprise a plurality of hardware devices to perform baseband signal processing, such as a processor 360, a transmission noise suppression device 370 (which will be further illustrated in the following paragraphs), or others. The baseband signal processing may comprise analog to digital conversion (ADC)/digital to analog conversion (DAC), gain adjustment, modulation/demodulation, encoding/decoding, and so on.

Note that in some embodiments of the invention, the radio module 300 may further comprise another central processor configured outside of the baseband processing device 350 for controlling the operations of the baseband processing device 350, the radio transceiver 340, and a memory device (not shown) which stores the system data and program codes of the radio module 300. Therefore, the invention should not be limited to the architecture as shown in FIG. 3. Note further that in some embodiments of the invention, there may be one or more transmission noise suppression devices in a communications apparatus (such as the communications apparatus 200). When there is only one transmission noise suppression device configured in the communications apparatus, the transmission noise suppression device may be integrated into the baseband processing device of one of the radio modules, or may be disposed outside of the radio modules. On the other hand, when there are multiple transmission noise suppression devices configured in the communications apparatus, each transmission noise suppression device may be integrated in and/or coupled to the corresponding baseband processing device of one radio module.

Figure 4:
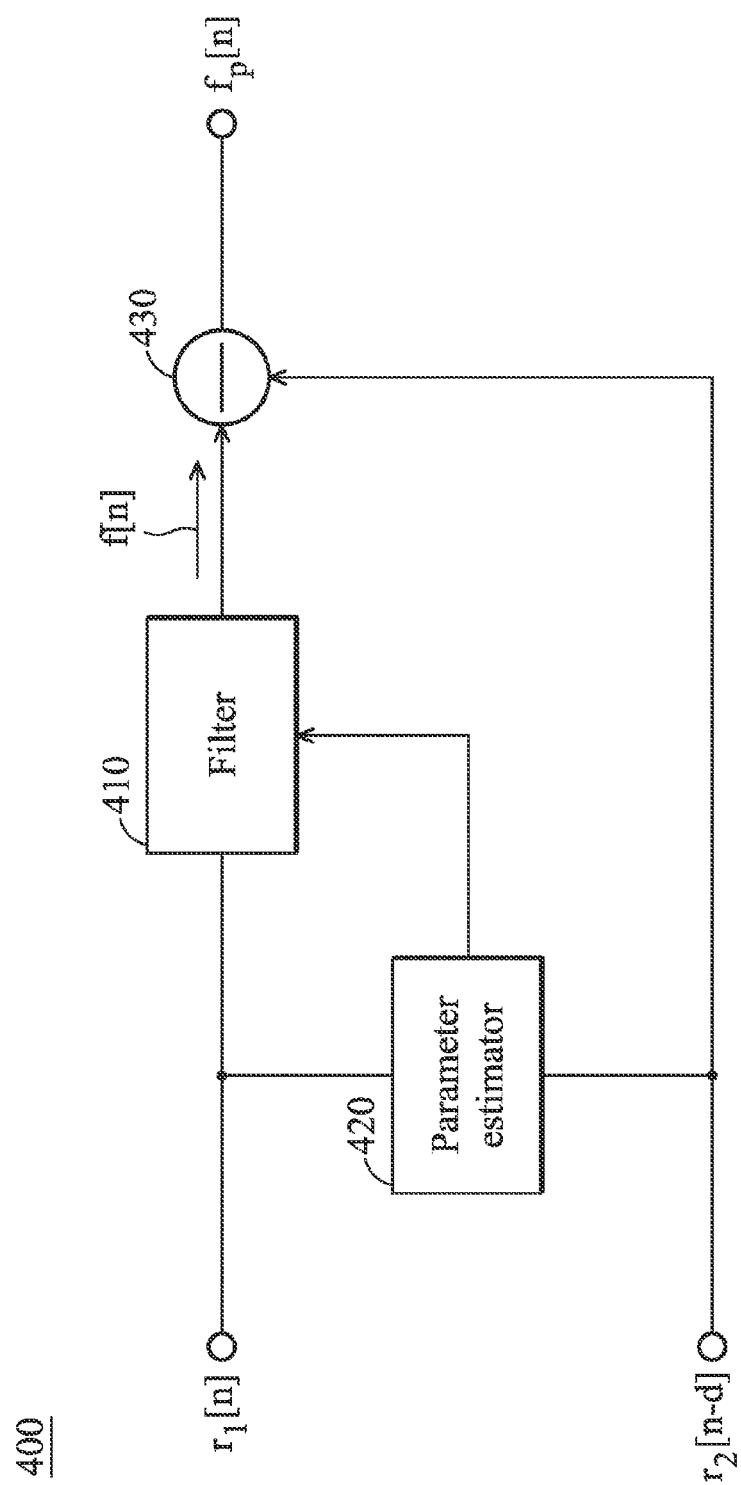
FIG. 4 shows a block diagram of a transmission noise suppression device according to an embodiment of the invention.

FIG. 4 shows a block diagram of a transmission noise suppression device according to an embodiment of the invention. According to an embodiment of the invention, the transmission noise suppression device 400 is operative to cancel transmission noise comprised in a plurality of downlink signals received by a radio module. To simplify illustration of the invention concept, it is assumed that a communications apparatus (such as the communications apparatus 200) comprises at least two radio modules. One may be an LTE module and the other may be a WiFi module. The LTE module may comprise at least two antennas for receiving RF signals, one of which is used for transmitting signals, and the WiFi module may comprise only one antenna for transmitting or receiving RF signals. Note that those who are skilled in this technology can still make various alterations and modifications, without departing from the scope and spirit of this invention, to implement the concept of this invention on different RAT radio modules. Therefore, the invention should not be limited to any specific method of implementation.

Case 1: When the LTE Module is Receiving while the WiFi Module is Transmitting

In cases in which the LTE module operates in downlink mode for receiving downlink signals and the WiFi module operates in uplink mode for transmitting uplink signals, transmission noise is generated when the WiFi module is processing the uplink signals to be transmitted. To be more specific, the transmission noise is a portion of the uplink signals received by one or more antennas of the LTE module when the LTE module is receiving the downlink signals and the WiFi module is transmitting the uplink signals at the same time. Therefore, the transmission noise suppression device 400 is operative to cancel the transmission noise comprised in the downlink signals received by the LTE module.

The transmission noise suppression device 400 may comprise two signal processing paths, where in a first signal processing path (shown as the upper one in FIG. 4), the signals $r_1[n]$ are received and processed, and in a second signal processing path (shown as the lower one in FIG. 4), the signals $r_2[n-d]$ are received and processed. In the embodiment of the invention, the signal $r_1[n]$ may be the downlink signals received by a first antenna of the LTE module and the signals $r_2[n-d]$ may be the downlink signals received by a second antenna of the LTE module. Therefore, there may be a path delay 'd' between the signals $r_2[n-d]$ with respect to the signal $r_1[n]$. Note that in cases of antenna borrowing (such as in case 2, in which the WiFi module borrows one antenna from the LTE module for performing transmission noise suppression, which will be illustrated in the following paragraphs), the signal $r_1[n]$ may be the downlink signals received by the WiFi module and the signals $r_2[n-d]$ may be the uplink signals to be transmitted by the LTE module, where the uplink LTE signals may be received by the WiFi module through a coupling path, which will be illustrated later.

The transmission noise suppression device 400 may further comprise a filter 410, a parameter estimator 420 and a subtractor 430. The filter 410 is disposed in the first signal processing path for receiving the signals $r_1[n]$ and filtering the signals $r_1[n]$ according to a plurality of filter parameters to obtain filtered signals $f[n]$. The parameter estimator 420 is coupled to the filter 410, receives the signals $r_1[n]$ and $r_2[n-d]$ and estimates the filter parameters according to the signals $r_1[n]$ and $r_2[n-d]$. The signals $r_2[n-d]$ are subtracted from the filtered signals $f[n]$ at the subtractor 430 to obtain the processed signals $f_p[n]$. In a preferred embodiment, the transmission noise does not manifest in the processed signals $f_p[n]$.

Signal model of the downlink signals $r[n]$ received by the LTE module may be represented as follows:

$$r[n] = \begin{bmatrix} r_1[n] \\ r_2[n-d] \end{bmatrix} = \begin{bmatrix} s_1[n] \\ s_2[n-d] \end{bmatrix} + \begin{bmatrix} \alpha_1 i[n] \\ \alpha_2 i[n-d] \end{bmatrix} + \begin{bmatrix} n_1[n] \\ n_2[n-d] \end{bmatrix} \quad \text{Eq. (1)}$$

where $s_1[n]=h_1[n]*t[n]$, $s_2[n]=h_2[n]*t[n]$, $t[n]$ represents the transmit signals, $h_1[n]$ and $h_2[n]$ represent channel responses of the channels between a peer communications device transmitting the transmit signals and the antennas of the LTE module, $i[n]$ represents the TX skirt (that is, the transmission noise) leaked from the WiFi module to the LTE module, $n_1[n]$ and $n_2[n]$ respectively represent the noise at the two antennas of the LTE module, $d$ represents path delay between the two antennas of the LTE module, and $\alpha_1$ and $\alpha_2$ represent the one-tap channel responses of the channels between the antenna of the WiFi module and the two antennas of the LTE module, respectively.

When the filter parameters are adequately designed to align the gain and timing of the TX skirt in the two receiving paths, the TX skirt can be cancelled and does not exist in the processed signals $f_p[n]$. To be more specific, when the impulse response of the filter 410 is designed as $$\delta[n-d]\frac{\alpha_2}{\alpha_1},$$

the filtered signals f[n] and processed signals $f_p[n]$ may be derived as follows:

$$f[n] = \frac{\alpha_2}{\alpha_1}s_1[n-d] + \alpha_2 i[n-d] + \frac{\alpha_2}{\alpha_1}n_1[n-d] \quad \text{Eq. (2)}$$

$$f_p[n] = \frac{\alpha_2}{\alpha_1}s_1[n-d] + \alpha_2 i[n-d] + \quad \text{Eq. (3)}$$
$$\frac{\alpha_2}{\alpha_1}n_1[n-d] - s_2[n-d] - \alpha_2 i[n-d] - n_2[n-d] =$$
$$\frac{\alpha_2}{\alpha_1}s_1[n-d] - s_2[n-d] + \frac{\alpha_2}{\alpha_1}n_1[n-d] - n_2[n-d]$$

Note that the TX skirts are cancelled and do not exist in the processed signals $f_p[n]$.

According to the embodiments of the invention, there are several ways for calculating (or estimating) the filter parameters $\alpha_1$, $\alpha_2$ and d, including at least a reference-based approach and two non-reference based approaches. For the reference-based approach, the uplink signals (which may be baseband signals) to be transmitted by the radio module operating in the uplink mode (for example, the WiFi module in case 1) is preferably transmitted to the radio module operating in downlink mode (for example, the LTE module in case 1) as a reference for deriving the filter parameters. The baseband signals may be transmitted between two radio modules via a specific interface (such as the interface 240 shown in FIG. 2) disposed therebetween. The interface may be a pin, a transmission line, a bus, or the like.

Method 1: Reference-Based Approach

In the embodiments of the invention, it is assumed that the TX skirt comprises two major components, including the inter-modulation signals $X_{IM}[n]$ and the TX noise $n_{tx}[n]$. The inter-modulation signals $X_{IM}[n]$ are the high-order inter-modulation (IM) terms generated due to the non-linearity of radio-frequency (RF) devices (such as the power amplifier) of the radio module operating in uplink mode and can be expressed by $$X_{IM}[n] = \sum_{k=3,5,\ldots K} a_k |s[n]|^{k-1} s[n],$$

where s[n] is the baseband signal to be transmitted by radio module operating in uplink mode and $a_k$ are the real inter-modulation coefficients. The TX noise $n_{tx}[n]$ is the noise generated by the RF devices when functioning. When the baseband signal to be transmitted by radio module operating in uplink mode can be obtained by the radio module operating in downlink mode via an internal interface (such as the interface 240 shown in FIG. 2), the inter-modulation signals may be reconstructed as a reference signal to derive the filter parameters.

Figure 5:
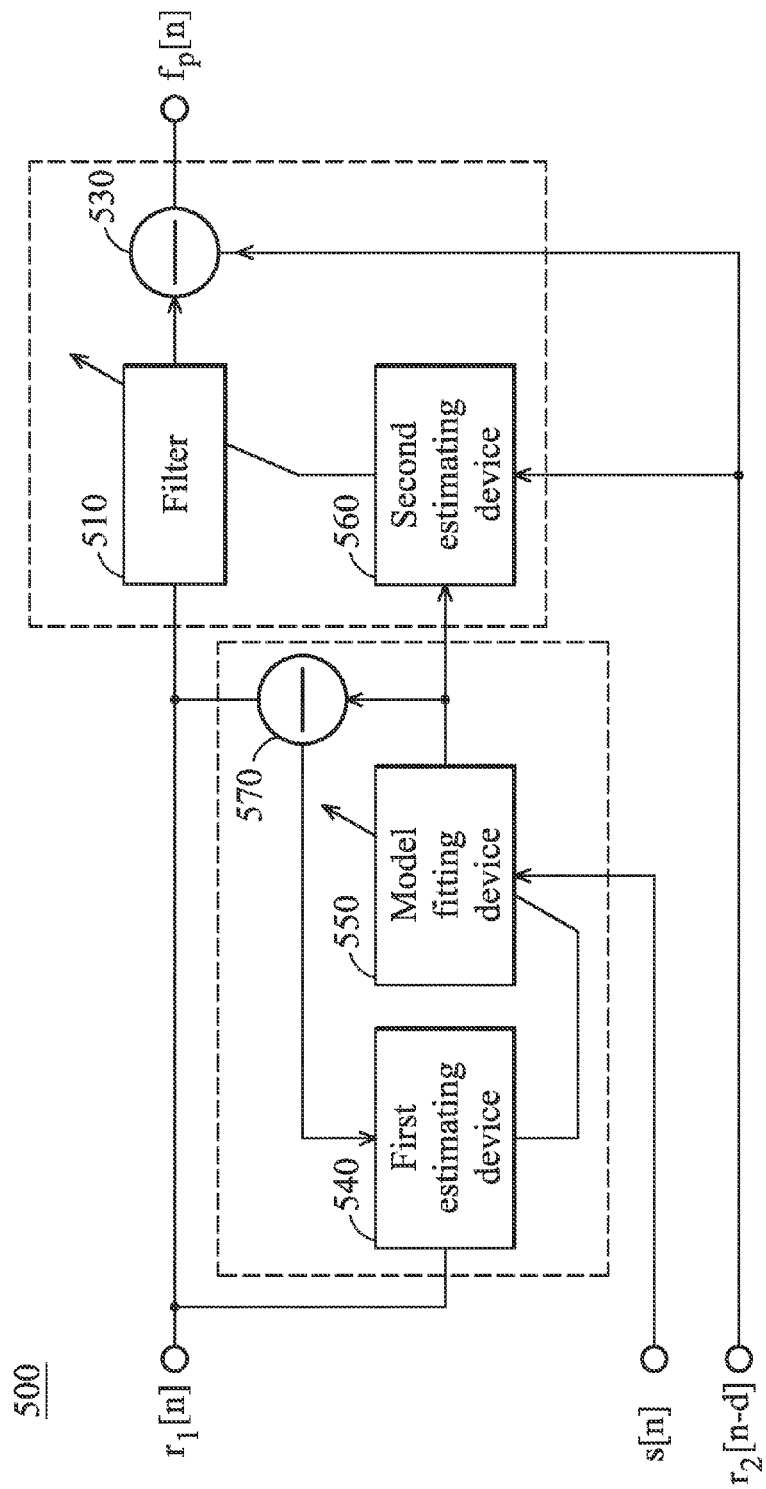
FIG. 5 shows a block diagram of an exemplary reference-based transmission noise suppression device according to an embodiment of the invention.

FIG. 5 shows a block diagram of an exemplary reference-based transmission noise suppression device according to an embodiment of the invention. The transmission noise suppression device 500 may comprise a filter 510, a subtractor 530 and a parameter estimator. The parameter estimator may comprise a first estimating device 540, a model fitting device 550, a second estimating device 560 and a subtractor 570. The first estimating device 540 may estimate a plurality of complex inter-modulation coefficients $â_k$, k=3, 5, . . . K (K is a positive integer) with a different order according to the downlink signals $r_1[n]$ based on a first adaptive algorithm.

The model fitting device 550 is coupled to the first estimating device 540, receives the estimated complex inter-modulation coefficients $â_k$ and reconstructs a plurality of inter-modulation reference signals $\hat{X}_{IM}[n]$ according to the estimated complex inter-modulation coefficients $â_k$. The second estimating device 560 is coupled to the model fitting device 550 and the filter 510, receives the reconstructed inter-modulation reference signals $\hat{X}_{IM}[n]$ and the downlink signals $r_2[n-d]$, and estimates the filter parameters g[1] according to the reconstructed inter-modulation reference signals $\hat{X}_{IM}[n]$ and the downlink signals $r_2[n-d]$ based on a second adaptive algorithm.

According to an embodiment of the invention, the first adaptive algorithm is to minimize the mean square error (MSE) of the cost function $J_1$:

$$J_1 = E\{|r_1[n] - \hat{X}_{IM}[n]|^2\} \quad \text{Eq. (4)}$$

where $$\hat{X}_{IM}[n] = \sum_{k=3,5,\ldots K} â_k |s[n]|^{k-1} s[n]$$

is the inter-modulation reference signals reconstructed by the model fitting device 550 and the estimated complex inter-modulation coefficients $â_k$ may be obtained by the first estimating device 540 according to the cost function $J_1$. Note that in the embodiments of the invention, the first estimating device 540 and the model fitting device 550 may form a first adaptive loop and the estimated real inter-modulation coefficients and the reconstructed inter-modulation reference signals may be respectively and adaptively updated according to the latest reconstructed inter-modulation reference signals and the latest estimated real inter-modulation coefficients.

According to an embodiment of the invention, the second adaptive algorithm is to minimize the mean square error (MSE) of the cost function $J_2$:

$$J_2 = E\left\{\left|r_2[n] - \sum_{l=0}^{L-1} g[l] \cdot \hat{X}_{IM}[n-1]\right|^2\right\} \quad \text{Eq. (5)}$$

where g[1] represents the estimated filter parameters of the filter 510 obtained by the second estimating device 560 and L is an order of the filter 510. Note that in the embodiments of the invention, the second estimating device 560 and the filter 510 may form a second adaptive loop and the filter parameters may be adaptively updated according to the latest reconstructed inter-modulation reference signals.

Note further that although, in the reference-based approach as illustrated above, only the inter-modulation portion of the TX skirt is reconstructed to estimate the filter parameters, the TX noise can still be cancelled based on the estimated filter parameters since the TX noise portion is another portion of the TX skirt i[n] and can be cancelled after filtering as shown in Eq. (2) and Eq. (3). Note further that the path receiving the signal $r_2[n-d]$ may not be a dedicated receiving path (that is, a full receiving path which comprises all the devices required for receiving the RF signals, such as the antenna, LNA, . . . etc.). In some embodiments of the invention, the path receiving the signal $r_2[n-d]$ may also be a coupling path, as will be further discussed below, which may include a coupling device coupled to the aggressor radio module which generates transmission noises.

Figure 6:
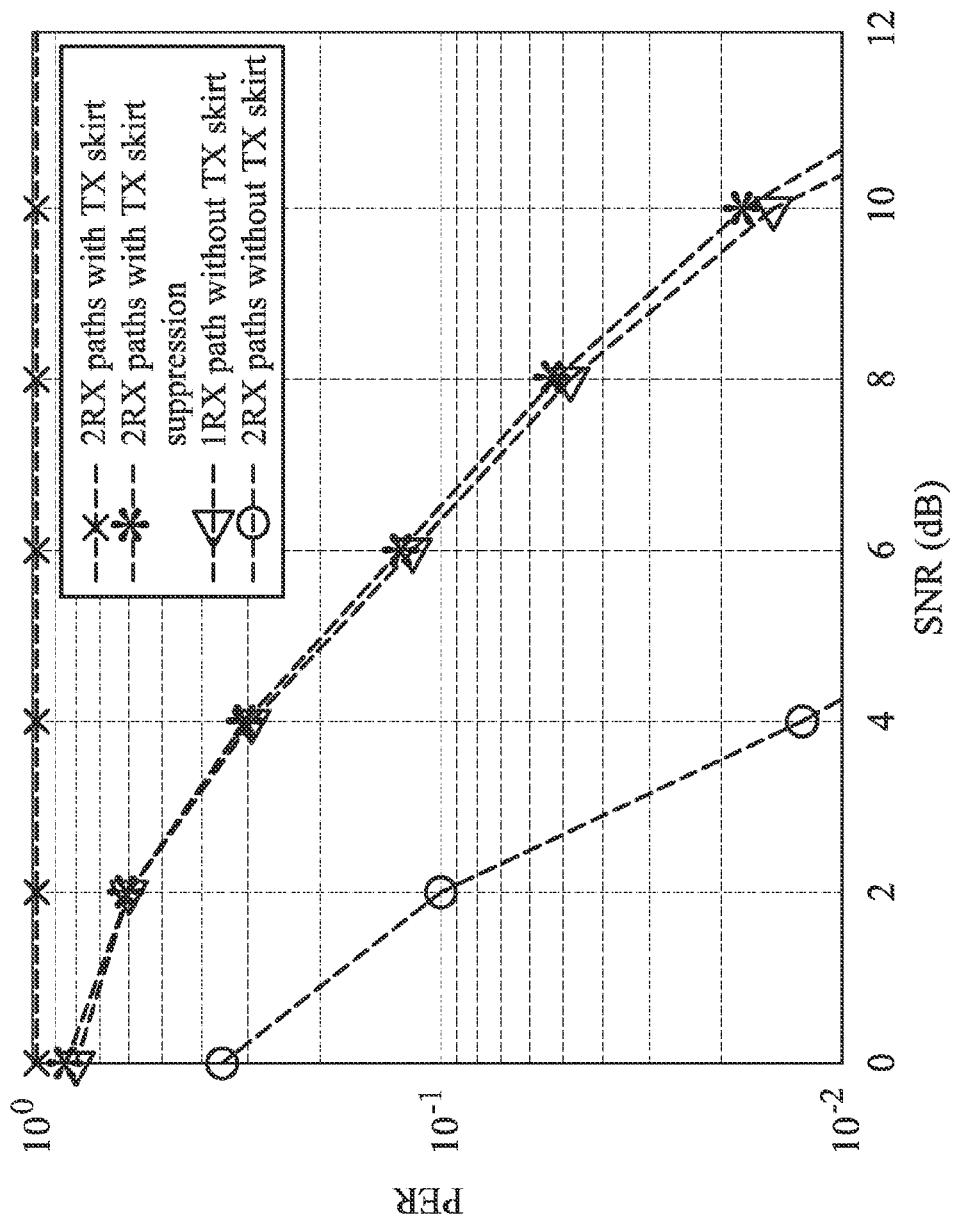
FIG. 6 shows several simulation results according to an embodiment of the invention.

FIG. 6 shows several simulation results according to an embodiment of the invention. As shown in FIG. 6, because one downlink stream (for example, the signals $r_2[n-d]$ received by the second antenna of the LTE module in the embodiments as illustrated above) is sacrificed for transmission noise suppression, only one data stream after TX skirt suppression (for example, the signals in the first signal processing path after subtractor 430 of the transmission noise suppression device 400) can utilized in subsequent signal processing. Therefore, the performance of 2RX (receiving) paths with TX skirt suppression approaches the performance of 1RX path without TX skirt and is much better than the performance of 2RX paths with TX skirt, but is worse than 2RX paths without TX skirt.

Note that the reference-based approach as illustrated above may also be extended for the Y RX paths case, where Y is greater than 2. For example, one RX can be chosen to be a reference path and be paired with the remaining RX paths to form multiple pairs of RX paths to implement the TX skirt suppression as illustrated above. Therefore, only (Y−1) data streams are utilized in subsequent signal processing after TX skirt suppression. The diversity gain is sacrificed for performing TX skirt suppression. Note that the reference RX path may not have to be a fixed one and may be randomly changed in each pairing.

Method 2: Non-Reference Based Approach

Figure 7:
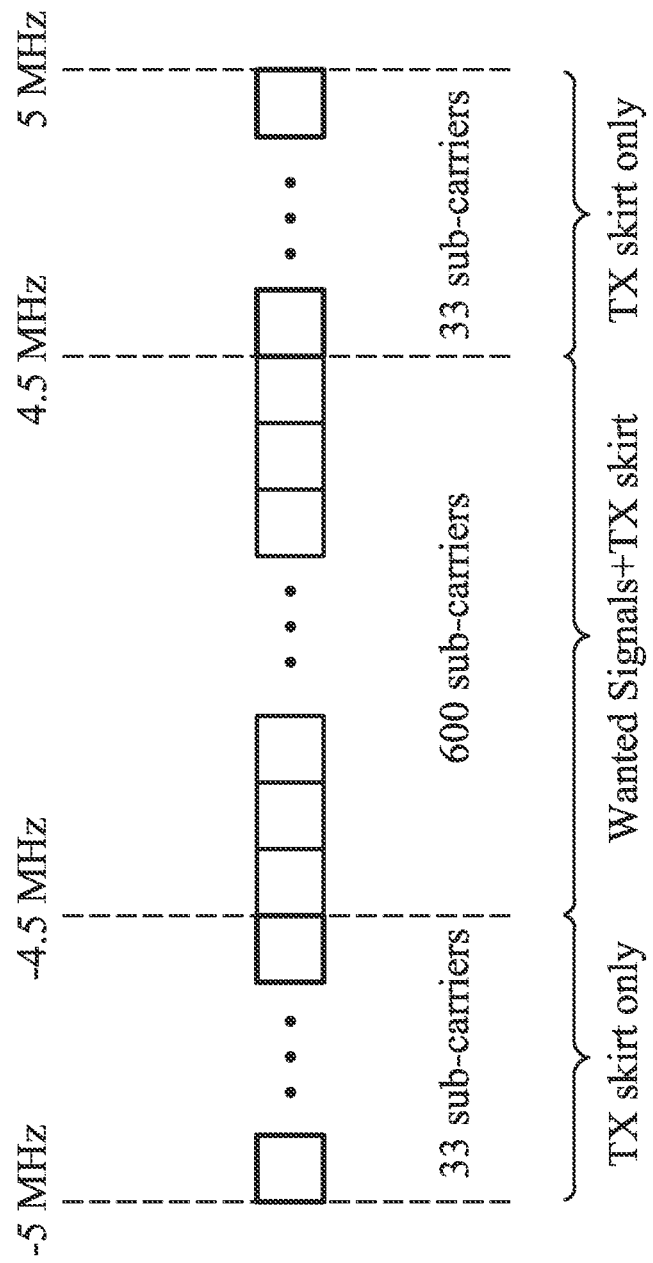
FIG. 7 is a schematic diagram showing sub-carrier utilization of a bandwidth 10 MHz OFDM symbol according to an embodiment of the invention.

In the non-reference based approach, the guard tones are utilized to estimate the filter parameters. FIG. 7 is a schematic diagram showing sub-carrier utilization of a bandwidth 10 MHz LTE OFDMA symbol according to an embodiment of the invention. As shown in FIG. 7, the wanted signals are carried on the central 600 sub-carriers from −4.5 MHz to 4.5 MHz and the upper and lower 33 sub-carriers from −5 MHz to −4.5 MHz and from 4.5 MHz to 5 MHz are reserved as the guard band. Therefore, 33 sub-carriers in the guard bands may carry only transmission noise so that the guard tones having information regarding the TX skirt may be utilized to estimate the filter parameters.

Figure 8:
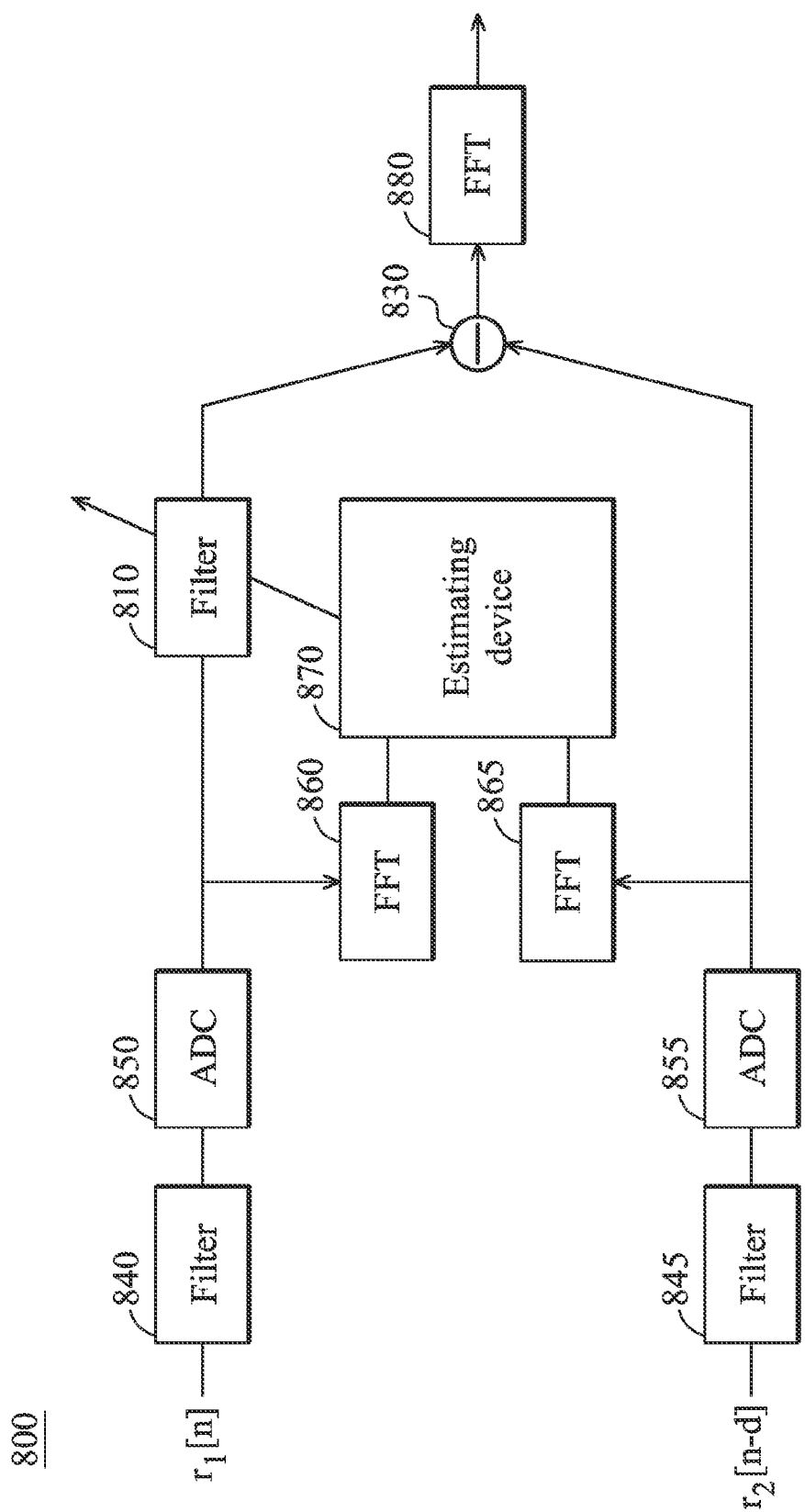
FIG. 8 shows a block diagram of an exemplary non-reference based transmission noise suppression device according to an embodiment of the invention.
Figure 9:
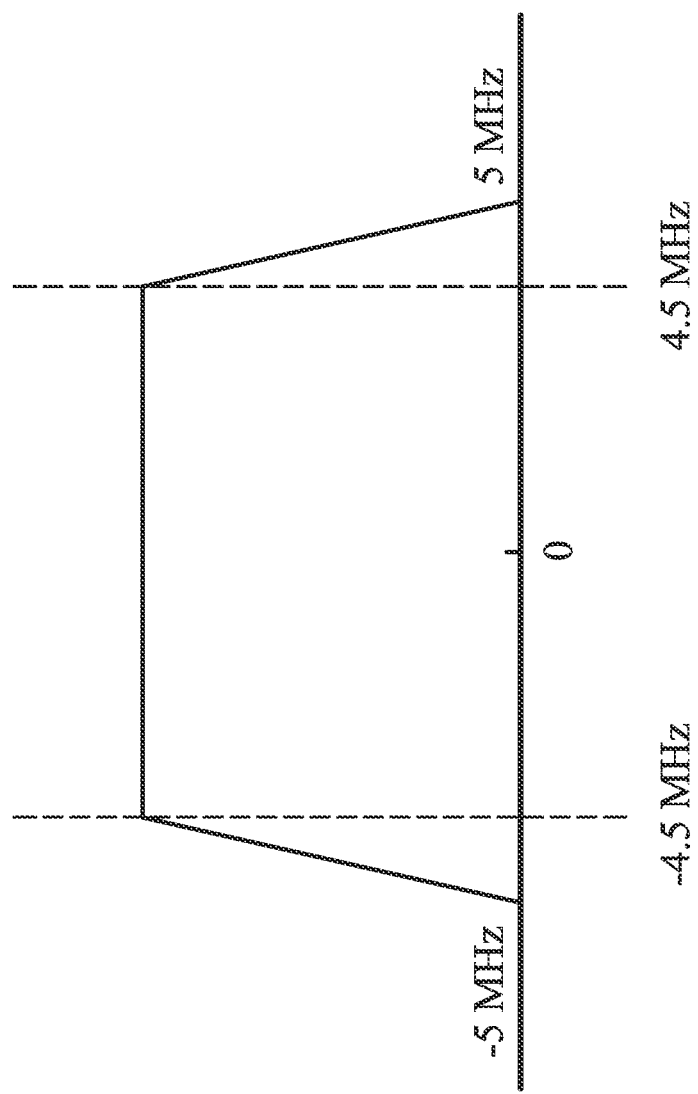
FIG. 9 shows the frequency response of a Chebyshev filter according to an embodiment of the invention.

FIG. 8 shows a block diagram of an exemplary non-reference based transmission noise suppression device according to an embodiment of the invention. The transmission noise suppression device 800 may comprise a filter 810, a subtractor 830, a Fast Fourier Transform (FFT) device 880 and a parameter estimator. The parameter estimator may comprise filters 840 and 845 and analog to digital converters (ADC) 850 and 855, respectively disposed on the first and second signal processing paths, FFT devices 860 and 865 and an estimating device 870. According to an embodiment of the invention, the filters 840 and 845 may be analog Chebyshev filters designed to filter out one symbol of data. FIG. 9 shows the frequency response of a Chebyshev filter according to an embodiment of the invention. As shown in FIG. 9, the Chebyshev filter with cut-off frequency at +4.5 MHz and −4.5 MHz may be utilized to extract a 10 MHz OFDMA symbol from the received downlink signals $r_1[n]$ and $r_2[n-d]$. Note that the filters 840 and 845 may also be designed to have different frequency responses for different RAT systems, and the invention should not be limited thereto.

The ADC 850 and 855 convert the filtered signals from the analog domain to the digital domain. The FFT devices 860 and 865 perform Fourier transformations on the analog to digital converted signal to obtain a plurality of transformed signals. The estimating device 870 is coupled to the FFT devices 860 and 865, and receives the transformed signals from the FFT devices 860 and 865, extracts a plurality of guard sub-carrier tones from the transformed signals, and estimates the filter parameters according to the guard sub-carrier tones based on a non-reference based algorithm.

According to an embodiment of the invention, based on the non-reference based algorithm, the estimating device 870 may first divide the values of the guard sub-carrier tones obtained from the second signal processing path by the values of the guard sub-carrier tones obtained from the first signal processing path to obtain a plurality of division results, and estimates the filter parameters ($\alpha_2/\alpha_1$) and d according to the amplitudes and phases of the division results. To be more specific, suppose that M-point FFT is taken on the guard sub-carrier tones of the received downlink signals $r_1[n]$ and $r_2[n-d]$, the transformed signals may be obtained as follows:

$$\begin{bmatrix} R_{1,null}[m] \\ R_{2,null}[m] \end{bmatrix} = \begin{bmatrix} \alpha_1 I[m] \\ \alpha_2[m]e^{\frac{j2\pi dm}{M}} \end{bmatrix} + \begin{bmatrix} N_1[m] \\ N_2[m]e^{\frac{j2\pi dm}{M}} \end{bmatrix} \quad \text{Eq. (6)}$$

where $R_{1,null}[m]$ and $R_{2,null}[m]$ are the guard sub-carrier tones picked up from the first and second signal processing paths, respectively.

When dividing the values of the guard sub-carrier tones obtained from the second signal processing path by the values of the guard sub-carrier tones obtained from the first signal processing path, the division results D[m] may be obtained as:

$$D[m] = \frac{R_{2,null}[m]}{R_{1,null}[m]} \approx \frac{\alpha_2 I[m]e^{\frac{j2\pi dm}{M}}}{\alpha_1 I[m]} \approx \left|\frac{\alpha_2}{\alpha_1}\right| e^{j\left\{\frac{2\pi dm}{M} + \angle\left(\frac{\alpha_2}{\alpha_1}\right)\right\}} \quad \text{Eq. (7)}$$

where N is a positive integer representing the number of guard sub-carrier tones, m is an index of the guard sub-carrier tones, $m=m_0, m_1, \ldots m_N$, $\alpha_1$ and $\alpha_2$ are complex values, $$\left|\frac{\alpha_2}{\alpha_1}\right|$$

represents an amplitude of $$\frac{\alpha_2}{\alpha_1} \text{ and } \angle\left(\frac{\alpha_2}{\alpha_1}\right)$$

represents a phase of $$\frac{\alpha_2}{\alpha_1}.$$

Figure 10:
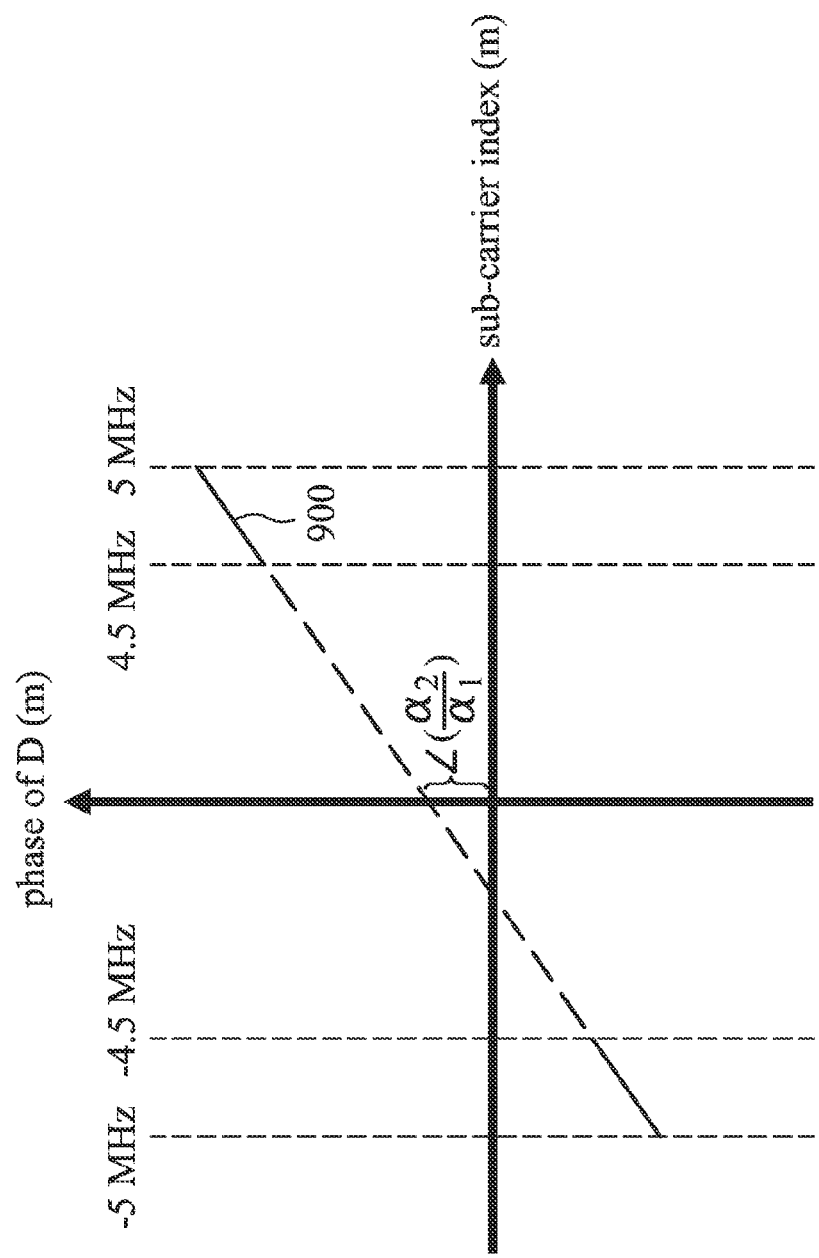
FIG. 10 shows a plot of the phase of the division results versus the sub-carrier index m according to an embodiment of the invention.

FIG. 10 shows a plot of the phase of the division results D[m] versus the sub-carrier index m according to an embodiment of the invention. From Eq. (7), it is understood that the slope of the line 900 is corresponding to the delay d and an offset of the line 900 with respect to the X axis is corresponding to the phase $$\angle\left(\frac{a_2}{\alpha_1}\right) \text{ of } \frac{\alpha_2}{\alpha_1}.$$

As the phase of D[m] and $$\frac{2\pi m}{M}$$

are known factors, the delay d and the phase $$\angle\left(\frac{\alpha_2}{\alpha_1}\right)$$

can be obtained by solving Eq. (7). Furthermore, the amplitude $$\left|\frac{\alpha_2}{\alpha_1}\right| \text{ of } \frac{\alpha_2}{\alpha_1}$$

can be derived from averaging the absolute values of D[m]. After obtaining the amplitude $$\left|\frac{\alpha_2}{\alpha_1}\right|$$

and phase $$\angle\left(\frac{\alpha_2}{\alpha_1}\right) \text{ of } \frac{\alpha_2}{\alpha_1},$$

the filter parameters $$\frac{\alpha_2}{\alpha_1}$$

may be derived by:

$$\frac{\alpha_2}{\alpha_1} = \left|\frac{\alpha_2}{\alpha_1}\right| e^{j\angle\left(\frac{\alpha_2}{\alpha_1}\right)} \qquad \text{Eq. (8)}$$

Referring back to FIG. 8, the filter 810 filters the analog to digital converted signals in the first signal processing path according to the filter parameters estimated by the estimating device 870 to generate filtered signals. The analog to digital converted signals in the second signal processing path are then subtracted from the filtered signals in the first signal processing path via the subtractor 830. The FFT device 880 further performs a Fourier transform on the output of the subtractor 830 for subsequent signal processing. In a preferred embodiment, the transmission noise does not manifest in the output of the subtractor 830.

Figure 11:
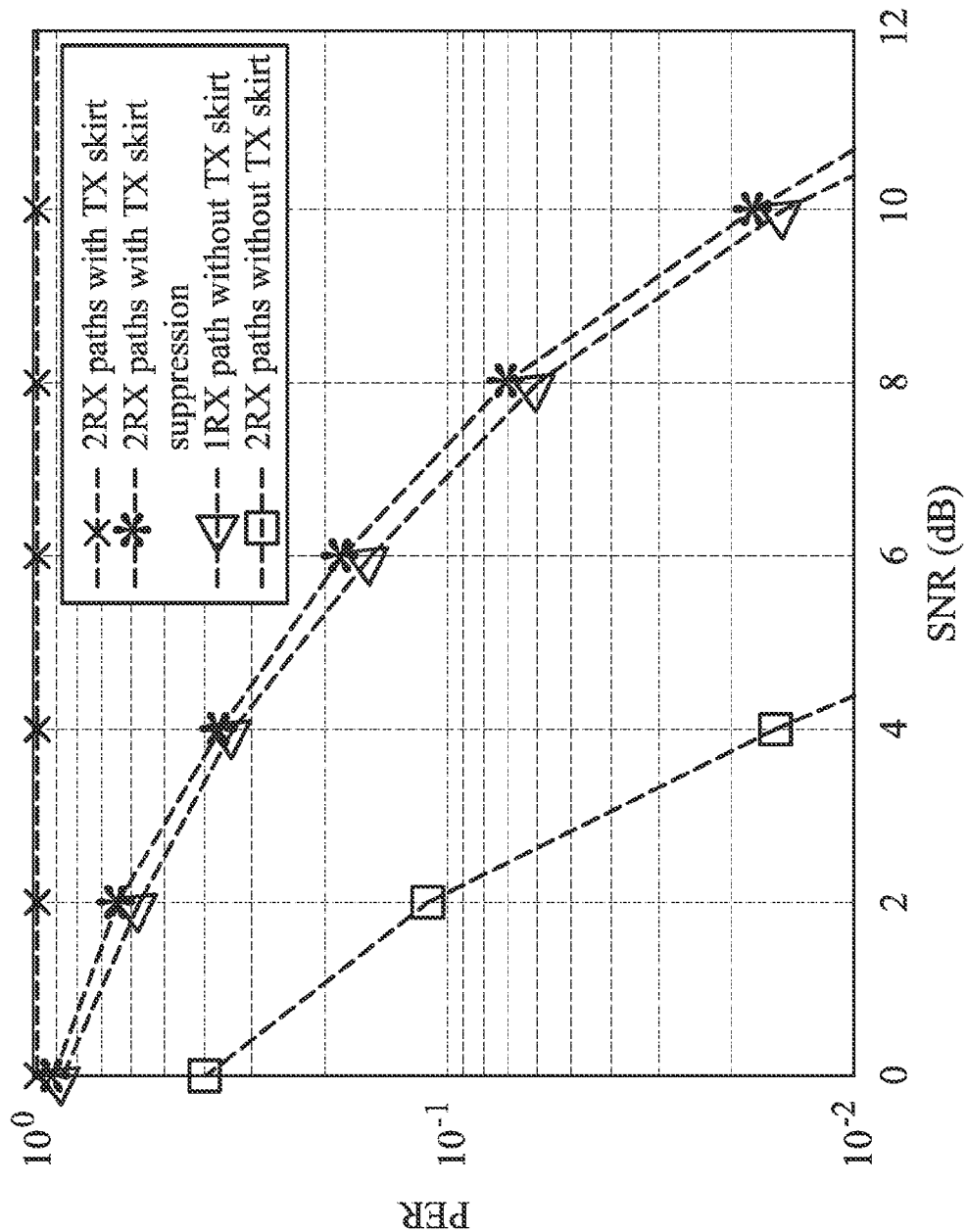
FIG. 11 shows several simulation results according to an embodiment of the invention.

FIG. 11 shows several simulation results according to an embodiment of the invention. As shown in FIG. 11, because one downlink stream (for example, the signals $r_2[n-d]$ received by the second antenna of the LTE module in the embodiments as illustrated above) is sacrificed for transmission noise suppression, only one data stream after TX skirt suppression (for example, the signals in the first signal processing path after subtractor 430 of the transmission noise suppression device 400) can be utilized in subsequent signal processing. Therefore, the performance of 2RX (receiving) paths with TX skirt suppression approaches the performance of 1RX path without TX skirt and is much better than the performance of 2RX paths with TX skirt, but is worse than 2RX paths without TX skirt.

Note that the non-reference based approach as illustrated above may also be extended for the Y RX paths case, where Y is greater than 2. For example, one RX can be chosen to be paired with the remaining RX paths to form multiple pairs of RX paths to implement the TX skirt suppression as illustrated above. Therefore, only (Y−1) data streams are utilized in subsequent signal processing after TX skirt suppression. The diversity gain is sacrificed for performing TX skirt suppression. Note that the chosen RX path for pairing may not have to be a fixed one and may be randomly changed in each pairing.

Method 3: Non-Reference Based Approach

In the embodiment, another non-reference based approach will be illustrated. According to the embodiment of the invention, the parameter estimator 420 as shown in FIG. 4 may estimate the filter parameters according to a covariance matrix of the downlink signals obtained from different receiving paths. Suppose that there is no path delay d between two receiving paths (for example, the path delay can be cancelled or compensated for after calibration), the filter parameter needed to be estimated by the parameter estimator 420 is only $$\frac{\alpha_2}{\alpha_1}.$$

The parameter estimator 420 may first calculate a spatial covariance matrix as below:

$$R = E\{r_{HPF}[n]r_{HPF}^H[n]\} \approx \frac{1}{N}\sum_{n=0}^{N-1} r_{HPF}[n]r_{HPF}^H[n] \approx \qquad \text{Eq. (9)}$$

$$\frac{1}{N}\begin{bmatrix} |\alpha_1|^2 & \alpha_1\alpha_2^* \\ \alpha_2\alpha_1^* & |\alpha_2|^2 \end{bmatrix}\sum_{n=0}^{N-1}[|i_{HPF}[n]|^2 + \sigma_n^2 I_2]$$

where $$r_{HPF}[n] = \begin{bmatrix} r_1[n] \\ r_2[n] \end{bmatrix},$$

$r_1[n]$ is the downlink signals received by the first antenna of the LTE module, $r_2[n]$ is the downlink signals received by the second antenna of the LTE module, $$i_{HPF}[n] = \begin{bmatrix} \alpha_1 i[n] \\ \alpha_2 i[n] \end{bmatrix},$$

$\sigma_n^2$ is the noise variance, $I_2$ is a 2×2 identity matrix and N here represents the number of samples of the downlink signal.

Note that information regarding the filter parameter $$\frac{\alpha_2}{\alpha_1}$$

is comprised in the spatial covariance matrix as shown in Eq. (9). Based on the spatial covariance matrix R shown in Eq. (9), a mathematic result may be obtained by $$\frac{\alpha_1}{\alpha_2} \approx \frac{R(2,1)}{R(1,1) - \lambda},$$

which is a closed-form solution, where R(i,j) is the (i,j)-th entry of R and λ is the eigenvalue corresponding to noise subspace and is given by:

$$\lambda = \frac{(R(1,1) + R(2,2)) - \sqrt{(R(1,1) + R(2,2))^2 - 4(R(1,1)R(2,2) - |R(1,2)|^2)}}{2} \qquad \text{Eq. (10)}$$

Therefore, the filter parameter $$\frac{\alpha_2}{\alpha_1}$$

may be derived according to Eq. (9) and Eq. (10).

According to the embodiments of the invention, no matter whether the reference-based approach or the non-reference based approaches as illustrated above are applied, the transmission noise comprised in the downlink signals is cancelled in the time domain before the downlink signals are transformed to the frequency domain. In other words, the transmission noise suppression is performed on the downlink signals in the time domain before performing FFT to transform the downlink signals to the frequency domain.

Case 2: When the WiFi Module is Receiving while the LTE Module is Transmitting

In cases where the WiFi module operates in downlink mode for receiving downlink signals and the LTE module operates in uplink mode for transmitting uplink signals, the transmission noise is generated when the LTE module is processing the uplink signals to be transmitted. Note that in this case, the transmission noise suppression device 400 is still able to cancel the transmission noise comprised in the downlink signals received by the WiFi module based on the reference-based approach or non-reference based approaches as illustrated above, even if there is only one antenna equipped in the WiFi module. To be more specific, when the LTE module comprises at least two antennas for transmitting or receiving RF signals and the WiFi module comprises only one antenna for transmitting or receiving RF signals, the WiFi module may "borrow" one antenna from the LTE module for performing the reference based or non-reference based transmission noise suppression approaches, as illustrated above.

Figure 12:
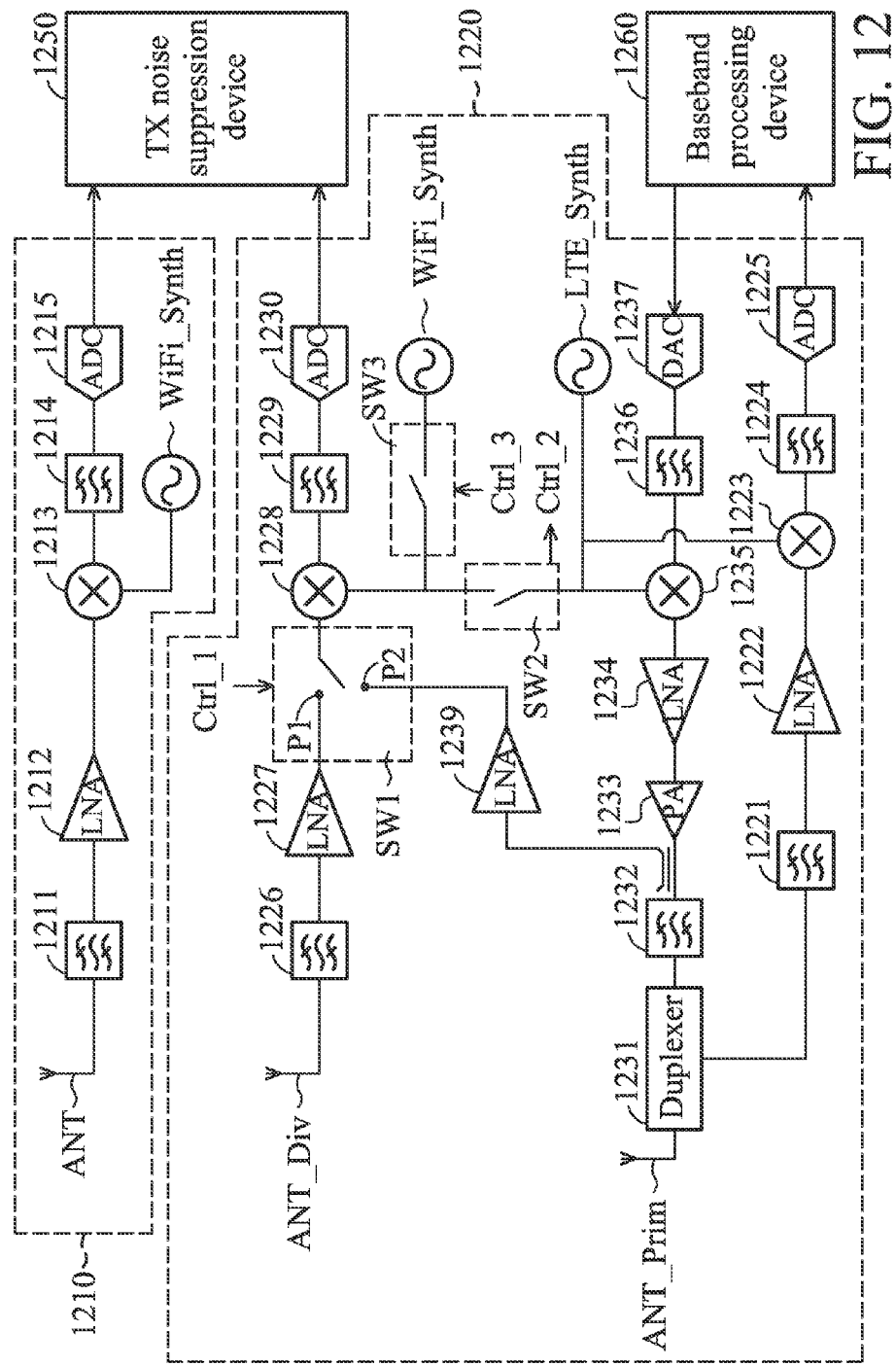
FIG. 12 is a block diagram showing a portion of the radio transceiver circuits of the WiFi and LTE modules according to an embodiment of the invention.

FIG. 12 is a block diagram showing a portion of the radio transceiver circuits of the WiFi and LTE modules according to an embodiment of the invention. The circuit 1210 may be a portion of the radio transceiver circuit of the WiFi module and may be coupled to the baseband processing device of the WiFi module (not shown) and the TX noise suppression device 1250. The circuit 1220 may be a portion of the radio transceiver circuit of the LTE module and may be coupled to the baseband processing device 1260 of the LTE module and the TX noise suppression device 1250. The circuit 1210 may comprise a WiFi receiving path, in which a bandpass filter 1211, a low noise amplifier 1212, a mixer 1213, a low pass filter 1214 and an analog to digital converter 1215 are coupled in serial between the antenna ANT and the baseband processing device. Note that the WiFi transmitting path is omitted here for brevity.

The circuit 1220 may comprise two LTE receiving paths and one LTE transmitting path. In the LTE primary receiving path, a bandpass filter 1221, a low noise amplifier 1222, a mixer 1223, a low pass filter 1224 and an analog to digital converter 1225 are coupled in serial between the primary antenna ANT_Prim and the baseband processing device 1260. In the LTE diversity receiving path, a bandpass filter 1226, a low noise amplifier 1227, a mixer 1228, a low pass filter 1229 and an analog to digital converter 1230 are coupled in serial between the diversity antenna ANT_Div and the baseband processing device 1260. The LTE transmitting path is also coupled to the primary antenna ANT_Prim via duplexer 1231. In the LTE transmitting path, a bandpass filter 1232, a power amplifier 1233, a low noise amplifier 1234, a mixer 1235, a low pass filter 1236, and a digital to analog converter 1237 are coupled in serial between the primary antenna ANT_Prim and the baseband processing device 1260.

According to an embodiment of the invention, in order to support the proposed antenna borrowing scheme, the LTE diversity receiving path is also coupled to the TX noise suppression device 1250. To be more specific, according to an embodiment of the invention, the communications apparatus may comprise multiple switches SW1, SW2, and SW3. The switch SW1 is coupled between the primary transmitting path and diversity receiving path of the LTE module for selectively connecting the low noise amplifier 1227 or the power amplifier 1233 to the mixer 1228 in response to a control signal Ctrl_1. Note that a coupling path which may include a coupling device such as another low noise amplifier 1239 may further be coupled between the power amplifier 1233 and the switch SW1. The switch SW2 is coupled to the mixer 1228 for selectively connecting an LTE frequency synthesizer LTE_Synth to the mixer 1228 in response to a control signal Ctrl_2. The switch SW3 is coupled to the mixer 1228 for selectively connecting a WiFi frequency synthesizer WiFi_Synth to the mixer 1228 in response to a control signal Ctrl_3. Note that the LTE frequency synthesizer LTE_Synth is utilized for generating a signal oscillating at a frequency utilized by the LTE module and the WiFi frequency synthesizer WiFi_Synth is utilized for generating a signal oscillating at a frequency utilized by the WiFi module.

According to an embodiment of the invention, the coexistence manager (such as the coexistence manager 230) may issue the control signals Ctrl_1, Ctrl_2 and Ctrl_3 according to the transceiving operations of the LTE and WiFi modules. For example, when the LTE module operates in uplink mode while the WiFi operates in downlink mode (i.e. case 2), the coexistence manager may issue the control signals Ctrl_1, Ctrl_2 and Ctrl_3 so that the switch SW1 is connected to node P2, the switch SW2 is opened and the switch SW3 is closed. In this manner, the low noise amplifier 1239 (or the power amplifier 1233) is connected to the mixer 1228, the LTE synthesizer LTE_Synth is disconnected from the mixer 1228, and the WiFi frequency synthesizer WiFi_Synth is connected to the mixer 1228. Therefore, the LTE diversity receiving path can be utilized for suppressing LTE TX skirt received by the WiFi module in which the LTE uplink signals to be transmitted (e.g. the output of the power amplifier 1233) can be further fed to the TX noise suppression device 1250 for transmission noise suppression to be performed therein. Note that the LTE uplink signals are frequency down converted by the mixer 1228 according to the oscillating signal generated by the WiFi frequency synthesizer WiFi_Synth.

On the other hand, when the LTE module operates in downlink mode while the WiFi operates in uplink mode (i.e. case 1), the coexistence manager may issue the control signals Ctrl_1, Ctrl_2 and Ctrl_3 so that the switch SW1 is connected to node P1, the switch SW2 is closed and the switch SW3 is opened. In this manner, the low noise amplifier 1227 is connected to the mixer 1228, the LTE synthesizer LTE_Synth is connected to the mixer 1228, and the WiFi frequency synthesizer WiFi_Synth is disconnected from the mixer 1228. Therefore, the LTE diversity receiving path is utilized by the LTE module.

Note that the above-mentioned reference-based approach (i.e. method 1) and non-reference based approaches (i.e. method 2 and method 3) are all applicable in case 2 and the structure as shown in FIG. 12 for performing transmission noise suppression. Therefore, descriptions of transmission noise suppression approaches in case 2 are omitted here for brevity.

Note further that in some other embodiments, the switches SW1, SW2, and/or SW3 as shown in FIG. 12 may be omitted. For example, the transmitting path of the LTE module may be directly (that is, there is no switch SW1) coupled to an input of the mixer 1228 disposed on a receiving path of the LTE module via a coupling path which may include a coupling device such as another low noise amplifier 1239. In addition, the WiFi frequency synthesizer WiFi_Synth and the LTE frequency synthesizer LTE_Synth may also be directly (that is, there are no switches SW2 and SW3) coupled to another input of the mixer 1228. The low noise amplifier 1227, the low noise amplifier 1239, the LTE frequency synthesizer LTE_Synth and the WiFi frequency synthesizer WiFi_Synth may be enabled or disabled by a corresponding control signal issued by the coexistence manager. To be more specific, when the LTE module operates in uplink mode while the WiFi operates in downlink mode (i.e. case 2), the coexistence manager may issue the control signals so that the low noise amplifier 1227 is disabled, the low noise amplifier 1239 is enabled, the LTE frequency synthesizer LTE_Synth is disabled and the WiFi frequency synthesizer WiFi_Synth is enabled. In this manner, the mixer 1228 is configured to receive a transmitting signal on the transmitting path through the coupling path and down-convert the transmitting signal to a frequency band utilized by the WiFi module in response to the control signal. Therefore, the LTE diversity receiving path can be utilized for suppressing LTE TX skirt received by the WiFi module in which the LTE uplink signals to be transmitted (e.g. the output of the power amplifier 1233) can be further fed to the TX noise suppression device 1250 for transmission noise suppression to be performed therein. Note that the LTE uplink signals are frequency down converted by the mixer 1228 according to the oscillating signal generated by the WiFi frequency synthesizer WiFi_Synth.

On the other hand, when the LTE module operates in downlink mode while the WiFi operates in uplink mode (i.e. case 1), the coexistence manager may issue the control signals so that the low noise amplifier 1227 is enabled, the low noise amplifier 1239 is disabled, the LTE frequency synthesizer LTE_Synth is enabled and the WiFi frequency synthesizer WiFi_Synth is disabled. In this manner, the mixer 1228 is configured to receive a received signal on the receiving path and down-convert the received signal to a frequency band utilized by the LTE module. Therefore, the LTE diversity receiving path is utilized by the LTE module.

Figure 15:
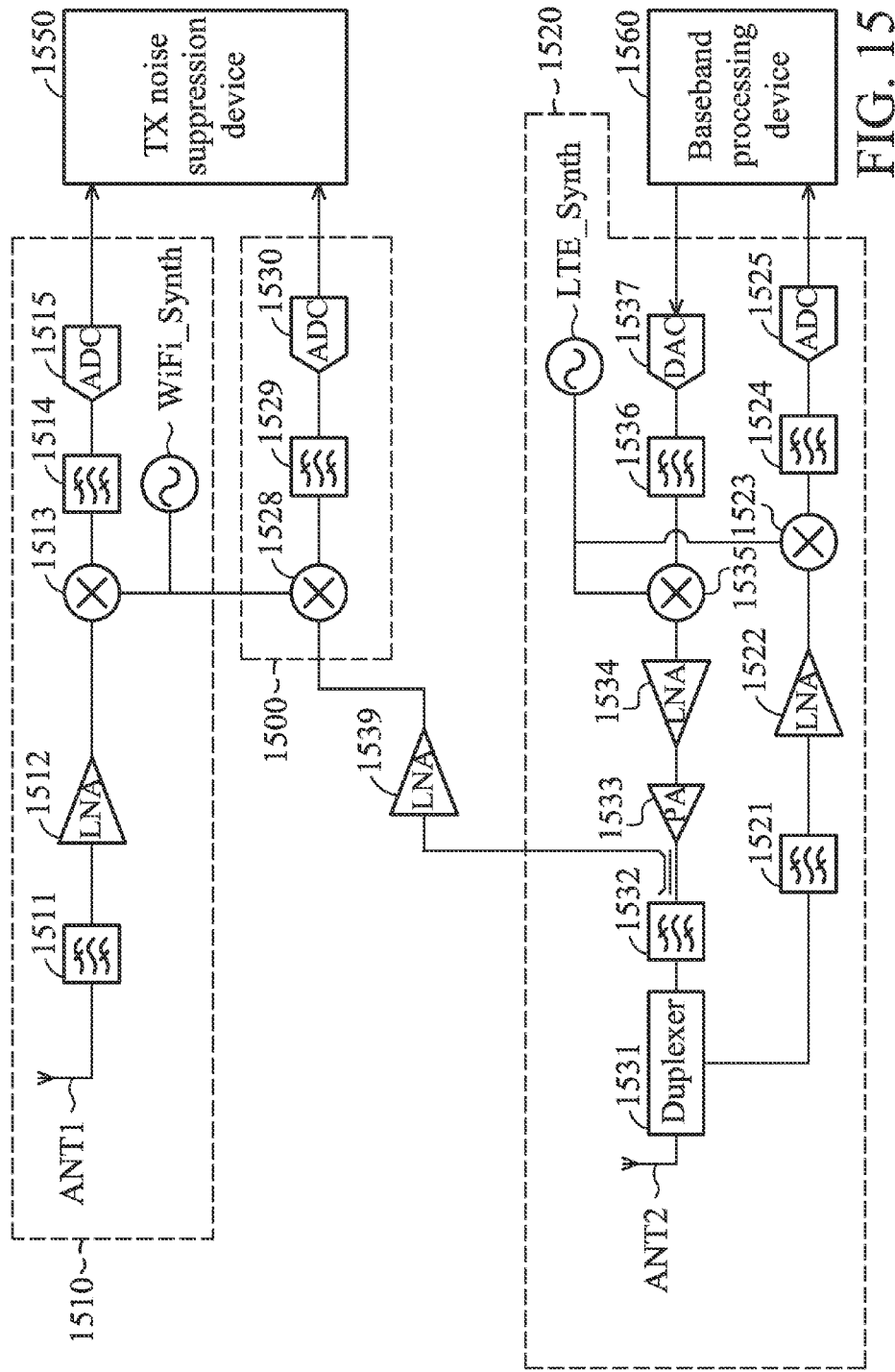
FIG. 15 is a block diagram showing a portion of the radio transceiver circuits of the WiFi and LTE modules according to another embodiment of the invention.

FIG. 15 is a block diagram showing a portion of the radio transceiver circuits of the WiFi and LTE modules according to another embodiment of the invention. The circuit 1510 may be a portion of the radio transceiver circuit of the WiFi module and may be coupled to the baseband processing device of the WiFi module (not shown) and the TX noise suppression device 1550. The circuit 1520 may be a portion of the radio transceiver circuit of the LTE module and may be coupled to the baseband processing device 1560 of the LTE module and the TX noise suppression device 1550. The circuit 1510 may comprise a WiFi receiving path, in which a bandpass filter 1511, a low noise amplifier 1512, a mixer 1513, a low pass filter 1514 and an analog to digital converter 1515 are coupled in serial between the antenna ANT1 and the baseband processing device. Note that the WiFi transmitting path is omitted here for brevity.

The circuit 1520 may also comprise one LTE receiving paths and one LTE transmitting path. In the LTE receiving path, a bandpass filter 1521, a low noise amplifier 1522, a mixer 1523, a low pass filter 1524 and an analog to digital converter 1525 are coupled in serial between the antenna ANT2 and the baseband processing device 1560. The LTE transmitting path is also coupled to the antenna ANT2 via duplexer 1531. In the LTE transmitting path, a bandpass filter 1532, a power amplifier 1533, a low noise amplifier 1534, a mixer 1535, a low pass filter 1536, and a digital to analog converter 1537 are coupled in serial between the antenna ANT2 and the baseband processing device 1560. In addition, a reference path 1500 comprising a mixer 1528, a low pass filter 1529 and an analog to digital converter 1530 may be introduced and coupled to the TX noise suppression device 1550, the circuit 1510 and the circuit 1520. A coupling path which may comprise a low noise amplifier 1539 may be coupled between the power amplifier 1533 and the mixer 1528 in the reference path.

FIG. 15 is similar to FIG. 12, and differs from that the mixer 1528, the low pass filter 1529 and the analog to digital converter 1530 comprised in the reference path 1500 are not a part of LTE receiving path. This scheme is helpful if the WiFi module contains only one antenna. To be more specific, when the LTE module operates in uplink mode while the WiFi operates in downlink mode (i.e. case 2), the LTE uplink signals to be transmitted (e.g. the output of the power amplifier 1533) can be further fed to the TX noise suppression device 1550 via a coupling path through low noise amplifier 1539 and the reference path 1500 for transmission noise suppression to be performed therein. Note that the LTE uplink signals are frequency down converted by the mixer 1528 according to the oscillating signal generated by the WiFi frequency synthesizer WiFi_Synth.

Note that the above-mentioned reference-based approach (i.e. method 1) and non-reference based approaches (i.e. method 2 and method 3) are all applicable in case 2 and the structure as shown in FIG. 15 for performing transmission noise suppression. Therefore, descriptions of transmission noise suppression approaches in case 2 are omitted here for brevity. Note further that since FIG. 15 has a similar structure and similar elements to FIG. 12 and like items are indicated like reference numbers, and descriptions of like items are not repeated here for brevity.

In yet another embodiment, the reference path 1500 may belong to one of the circuits 1510 and 1520, i.e., the mixer 1528, the low pass filter 1529 and the analog to digital converter 1530 may be a part of a WiFi receiving path or a part of a LTE receiving path. In other words, the proposed architecture can be applied to any number of antennas/receiving paths with slight modifications. Note further that the architecture as illustrated above may also be applied when the circuit 1510 comprises more than one antenna and more than one receiving path. For example, when the WiFi module 1510 is equipped with more than one antenna (such as a MIMO WiFi design), the LTE uplink signals received through the coupling path 1539 and the reference path 1500 may be paired with each RX path in the circuit 1510 to form multiple pairs of RX paths to implement the TX skirt suppression as illustrated above. In this way, the diversity gain of WiFi module is not sacrificed for performing TX skirt suppression.

Figure 13:
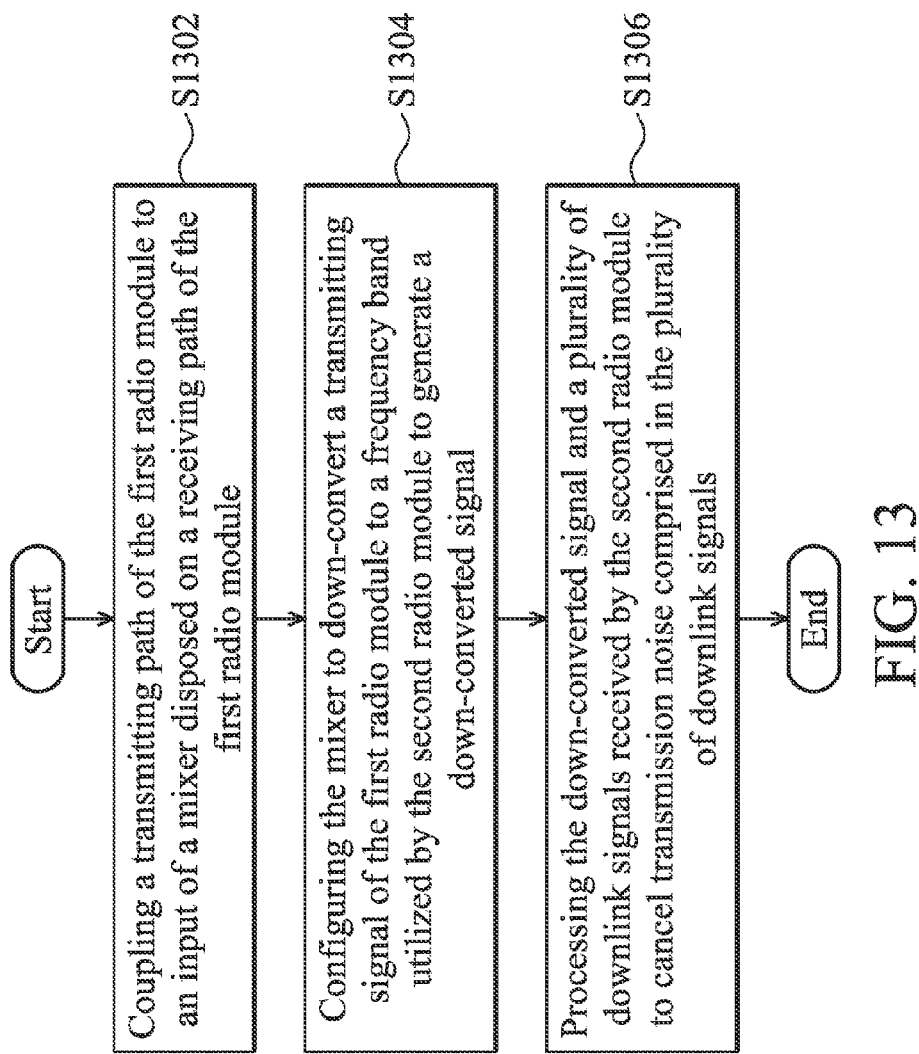
FIG. 13 is a flow chart showing a method applied in a communications apparatus applying an antenna borrowing scheme for suppressing transmission noise according to an embodiment of the invention.

FIG. 13 is a flow chart showing a method applied in a communications apparatus applying an antenna borrowing scheme for suppressing transmission noise according to an embodiment of the invention. In the embodiment, one of a first radio module and a second radio module comprised in the communications apparatus is utilized for suppressing transmission noise comprised in a plurality of downlink signals received by the second radio module, and the transmission noise is generated when the first radio module is processing a plurality of uplink signals to be transmitted. First of all, as discussed above, a transmitting path of the first radio module may be coupled to an input of a mixer disposed on a receiving path of the first radio module (Step S1302). Next, the mixer may be configured to down-convert a transmitting signal of the first radio module to a frequency band utilized by the second radio module to generate a down-converted signal (Step S1304). Finally, the down-converted signal and a plurality of downlink signals received by the second radio module are processed to cancel transmission noise comprised in the plurality of downlink signals (Step S1306).

Figure 14:
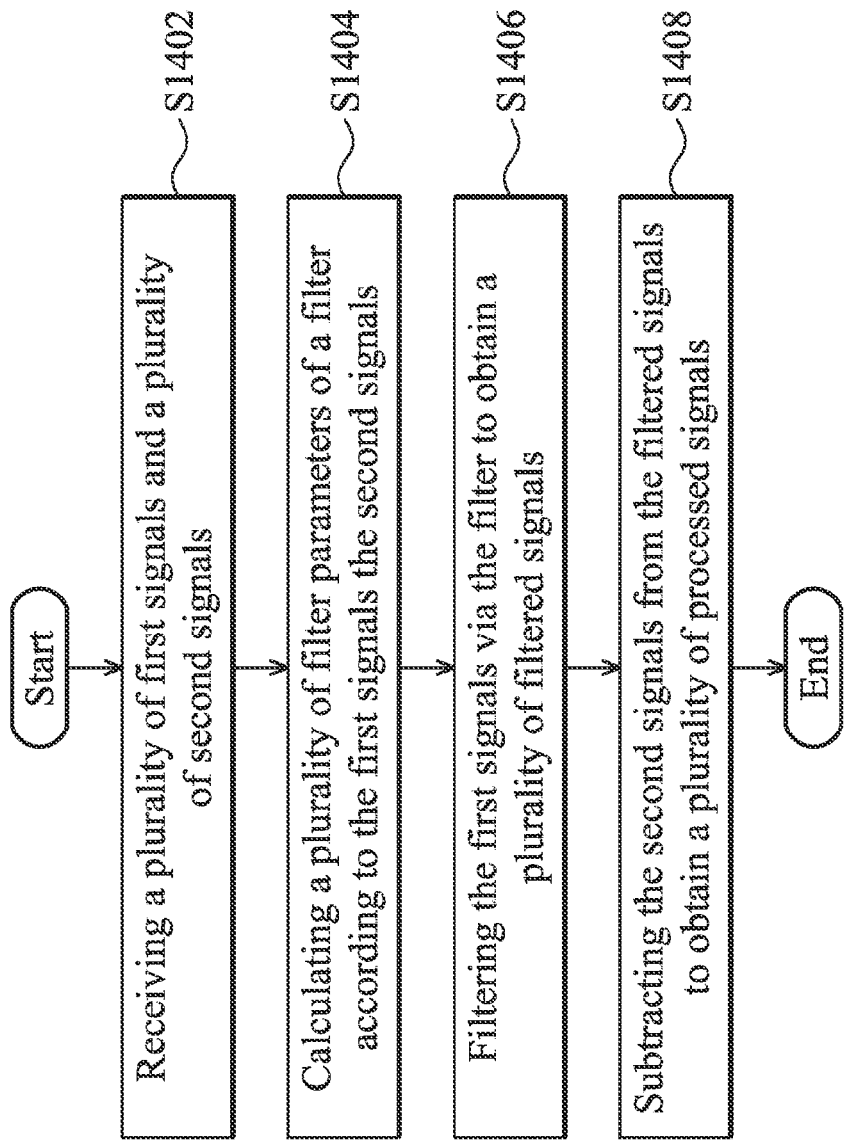
FIG. 14 is a flow chart showing a method for suppressing transmission noise comprised in the received downlink signal according to an embodiment of the invention.

FIG. 14 is a flow chart showing a method for suppressing transmission noise comprised in the received downlink signal according to an embodiment of the invention. After receiving a plurality of first signals via a first signal processing path and a plurality of second signals via a second signal processing path (Step S1402), a plurality of filter parameters for a filter are calculated according to the first signals and the second signals (Step S1404). Next, the first signals are filtered via the filter to obtain a plurality of filtered signals (Step S1406). Finally, the second signals are subtracted from the filtered signals to obtain a plurality of processed signals (Step S1408).

According to an embodiment of the invention, when the radio module operating in downlink mode is equipped with at least two antennas, the first signals and the second signals may both be the downlink signals received by the radio module operating in the downlink mode (for example, respectively received via different antennas of the radio module). However, when the radio module operating in downlink mode is equipped with only one antenna, the first signals may be the downlink signals received by the radio module operating in the downlink mode and the second signals may be a portion of the uplink signals received from another radio module operating in the uplink mode (as in the antenna borrowing scheme illustrated in case 2).

Note that in Step S1404 of calculating the filter parameters, the above-mentioned reference-based approach (i.e. method 1) and non-reference based approaches (i.e. method 2 and method 3) are all applicable. Therefore, detailed descriptions of the steps of calculating the filter parameters are omitted here for brevity.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for suppressing transmission noise comprised in a plurality of downlink signals received by one of a first radio module or a second radio module comprised in a communications apparatus, wherein the transmission noise is generated when the other one of the first radio module or the second radio module is processing a plurality of uplink signals to be transmitted, the method comprising:
receiving a plurality of first signals and a plurality of second signals, wherein the first signals and the second signals are the downlink signals respectively received via different antennas of the one of the first radio module or the second radio module, or the first signals are the downlink signals received by the one of the first radio module or the second radio module and the second signals are a portion of the uplink signals provided by the other one of the first radio module and the second radio module; and
processing the plurality of first signals and the plurality of second signals to cancel transmission noise comprised in the plurality of downlink signals.

2. The method as claimed in claim 1, wherein when the step of processing the plurality of first signals and the plurality of second signals comprises:
calculating a plurality of filter parameters for a filter according to the first signals and the second signals;
filtering the first signals via the filter to obtain a plurality of filtered signals;
subtracting the second signals from the filtered signals to obtain a plurality of processed signals.

3. The method as claimed in claim 2, wherein the step of calculating the plurality of filter parameters for the filter according to the first signals and the second signals comprises:
calculating a covariance of the first signals and the second signals; and
estimating filter parameters according to the covariance.

4. The method as claimed in claim 1, wherein the step of processing the plurality of first signals and the plurality of second signals comprises:
performing a Fourier transformation on the first signals to obtain a plurality of first transformed signals;
performing a Fourier transformation on the second signals to obtain a plurality of second transformed signals;
extracting a plurality of first guard sub-carrier tones from the first transformed signals and a plurality of second guard sub-carrier tones from the second transformed signals; and
calculating the filter parameters according to the first guard sub-carrier tones and the second guard sub-carrier tones based on a non-reference based algorithm.

5. A communications apparatus, comprising:
a first radio module, providing a first wireless communications service and communicating with a first communications device in compliance with a first protocol; and
a second radio module, providing a second wireless communications service and communicating with a second communications device in compliance with a second protocol, wherein the second protocol is different from the first protocol;
wherein a transmitting signal of the first radio module is drawn, by a coupling path, to a down-conversion circuit to be down-converted to a frequency band utilized by the second radio module.

6. The communications apparatus as claimed in claim 5, wherein the first radio module comprises a mixer disposed in a receiving path for performing down-conversion and the coupling path selectively coupled to a transmitting path of the first radio module and an input of the mixer according to a control signal; wherein the mixer is configured to receive a transmitting signal on the transmitting path through the coupling path and down-convert the transmitting signal to the frequency band utilized by the second radio module in response to the control signal.

7. The communications apparatus as claimed in claim 5, wherein the control signal configures the coupling path to couple between the transmitting path and the input of the mixer and configures the mixer to down-convert the transmitting signal to the frequency band utilized by the second radio module when the first radio module is processing a plurality of uplink signals to be transmitted and the second radio module is processing a plurality of downlink signals.

8. The communications apparatus as claimed in claim 5, wherein the down-conversion circuit comprises a mixer disposed outside of the first radio module for down-converting the transmitting signal to the frequency band utilized by the second radio module.

9. A method applied in a communications apparatus comprising a first radio module or a second radio module, the method comprising:
coupling a transmitting path of the first radio module to a down-conversion circuit;
down-converting an uplink signal of the first radio module to a frequency band utilized by the second radio module to generate a down-converted signal; and
processing the down-converted signal and a plurality of downlink signals received by the second radio module.

10. The method as claimed in claim 9, wherein the frequency band utilized by the second radio module is different from a frequency band utilized by the first radio module.

11. The method as claimed in claim 9, wherein the down-conversion circuit comprises a mixer disposed on a receiving path of the first radio module.

* * * * *